(12) United States Patent  
Krüger et al.

(10) Patent No.: US 12,434,547 B2  
(45) Date of Patent: Oct. 7, 2025

(54) TRACTION BATTERY VEHICLE FLOOR

(71) Applicant: Dr. Ing. h.c. F. Porsche Aktiengesellschaft, Stuttgart (DE)

(72) Inventors: Jens Krüger, Bönnigheim (DE); Marco Augustdörfer, Leonberg (DE); Ronny Brodersen, Sachsenheim (DE); Daniel Morický, Pecky (CZ)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 360 days.

(21) Appl. No.: 18/107,048

(22) Filed: Feb. 8, 2023

(65) Prior Publication Data

US 2023/0271492 A1    Aug. 31, 2023

(30) Foreign Application Priority Data

Feb. 25, 2022   (DE) ............... 10 2022 104 569.2

(51) Int. Cl.
| | |
|---|---|
| *B60K 1/04* | (2019.01) |
| *B60L 50/60* | (2019.01) |
| *B60L 50/64* | (2019.01) |
| *H01M 50/242* | (2021.01) |
| *H01M 50/249* | (2021.01) |

(52) U.S. Cl.
CPC ............... *B60K 1/04* (2013.01); *B60L 50/64* (2019.02); *B60L 50/66* (2019.02); *H01M 50/242* (2021.01); *H01M 50/249* (2021.01); *B60K 2001/0438* (2013.01); *H01M 2220/20* (2013.01)

(58) Field of Classification Search
CPC ... B60K 1/04; B60K 2001/0438; B60L 50/64; B60L 50/66

See application file for complete search history.

(56) References Cited

U.S. PATENT DOCUMENTS 10,340,564 B2    7/2019 Nishikawa et al.
10,493,837 B1 *  12/2019 Angelo ................ B60L 50/66

(Continued)

FOREIGN PATENT DOCUMENTS

| CN | 103538457 A | 1/2014 |
|---|---|---|
| CN | 206749896 A | 12/2017 |

(Continued)

OTHER PUBLICATIONS

Swedish Search Report for Application No. 2350142-2, dated Aug. 23, 2023, 1 page.

(Continued)

*Primary Examiner* — Brian L Swenson
(74) *Attorney, Agent, or Firm* — Buchanan Ingersoll & Rooney PC

(57) ABSTRACT

A traction battery vehicle floor has a plurality of self-supporting battery modules arranged in a horizontal plane (X,Y). The battery modules are fastened in a supporting manner directly to two lateral vehicle floor longitudinal supports. Adjacent to the frontmost and/or rearmost battery module, an electrical battery control module having a self-supporting battery control module housing is arranged in the battery module horizontal plane (X, Y). The two transverse ends of the battery control module housing are each structurally connected to the corresponding longitudinal support in a supporting manner.

7 Claims, 3 Drawing Sheets

(56) References Cited

U.S. PATENT DOCUMENTS

| | | | |
|---|---|---|---|
| 10,811,645 B2 * | 10/2020 | Stojanovic | H01M 10/6556 |
| 11,018,392 B2 * | 5/2021 | Wuensche | H01M 10/625 |
| 2015/0171390 A1 * | 6/2015 | Yoshioka | H01M 50/271 |
| | | | 180/65.21 |
| 2018/0105209 A1 * | 4/2018 | Fees | H01M 50/249 |
| 2021/0129651 A1 | 5/2021 | Klomberg et al. | |
| 2021/0184194 A1 | 6/2021 | Lim et al. | |
| 2022/0009359 A1 | 1/2022 | Kellner et al. | |
| 2023/0039653 A1 | 2/2023 | Eiletz et al. | |
| 2023/0065084 A1 * | 3/2023 | Nakata | H04W 76/15 |
| 2023/0271492 A1 | 8/2023 | Krüger et al. | |

FOREIGN PATENT DOCUMENTS

| | | |
|---|---|---|
| CN | 113540635 A | 10/2021 |
| CN | 218966662 U | 5/2023 |
| DE | 102011120960 A1 | 4/2013 |
| DE | 102015216225 A | 3/2017 |
| DE | 102019102901 A1 | 8/2020 |
| DE | 102020101154 A1 | 7/2021 |
| DE | 102020112656 A1 | 11/2021 |
| DE | 102020117832 A1 | 1/2022 |
| EP | 3267508 A1 | 1/2018 |
| EP | 3345779 A1 | 7/2018 |
| EP | 3346517 A1 | 7/2018 |
| JP | 2005231549 A | 9/2005 |
| JP | 2016062705 A | 4/2016 |
| JP | 2018006313 A | 1/2018 |
| JP | 2020068102 A | 4/2020 |
| WO | 2020217014 A1 | 10/2020 |

OTHER PUBLICATIONS

Great Britain Combined Search & Examination Report for Application No. GB2302607.3, dated Aug. 24, 2023, 4 pages.

* cited by examiner

TRACTION BATTERY VEHICLE FLOOR

CROSS-REFERENCE TO RELATED APPLICATION

This application claims priority to German Patent Application No. 10 2022 104 569.2, filed Feb. 25, 2022, the content of such application being incorporated by reference herein in its entirety.

FIELD OF THE INVENTION

The invention relates to a vehicle floor having a traction battery integrated in the vehicle floor.

BACKGROUND OF THE INVENTION

Due to the low center of gravity, the relatively good crash safety, and the relatively good accessibility for maintenance, repair, and replacement, traction batteries of battery-electric vehicles are often housed in a plate-like form in the vehicle floor. A traction battery is comprised of several identical block-like battery modules, each of which can have a module voltage of 20 to over 200 V. All battery modules can be arranged in a horizontal plane and gathered together and housed inside a single overall housing.

Alternatively, the battery modules can be gathered together in a horizontal plane by a suitable frame construction and connected to the chassis. From EP 3 345 779 B1, which is incorporated by reference herein, a crash-rigid frame construction having a rectangular closed frame is known, in which a plurality of battery modules as well as the electronic battery controller are framed and structurally gathered in a crash-proof manner.

Other structural concepts for floor-side traction batteries are known from DE 10 2015 216 225 A1, EP 3267508 B1, U.S. Pat. No. 10,811,645 B2, CN 20 674 9896, and CN 10 3 538 457 A, which are each incorporated by reference herein.

SUMMARY OF THE INVENTION

Described herein is a simply constructed traction battery vehicle floor with good crash characteristics.

The traction battery vehicle floor according to the present invention comprises a plurality of self-supporting battery modules arranged in a single horizontal plane. The battery modules each comprise a crash-stable battery module housing, which can be configured so as to be substantially fluid-tight. The module housing can be configured so as to be perfusable by a cooling liquid and can thus be part of an active cooling circuit. Alternatively or additionally, the battery modules can also be cooled by an actively cooled cooling plate below and/or above the battery modules. In any case, the battery module housing has a rigidity and strength that protects the battery module housing against relevant deformations in the vehicle longitudinal direction, and in particular in the vehicle transverse direction, in the event of a crash.

The battery modules are directly fastened in a supporting manner to two lateral vehicle floor longitudinal supports that form a structural part of the self-supporting body structure. No battery module is directly fastened to a transverse support. In particular, no transverse support is provided in the center of the longitudinal extension of the traction battery. The required crash strength of the traction battery in the transverse direction is produced, substantially or approximately, exclusively by the battery modules themselves or by the battery module housing.

Further, a bar-like electrical battery control module is provided, being arranged adjacent to the frontmost and/or the rearmost battery module(s) in the battery module horizontal plane. The battery control module also comprises a self-supporting and crash-stable battery control module housing, which is structurally connected in a supporting manner to the corresponding longitudinal support at each of its two transverse ends. The battery control module housing therefore contributes to the structural strengthening of the overall traction battery network consisting of the battery modules, the battery control module, and the two longitudinal supports.

Preferably, the battery modules or their housings are each configured as identical, elongated cuboids, which are aligned with their longitudinal extension in the vehicle transverse direction and which are arranged in two rows extending in the vehicle longitudinal direction, having at least three battery modules each. Thus, the smallest side walls of a given battery module housing lie in vertical longitudinal planes, such that, when viewed in the vehicle longitudinal direction, the entire battery module network has a relatively large number of vertical housing side walls, all of which lie in vertical transverse planes and, in conjunction with the battery control module housing, result in a high structural transverse rigidity of the traction battery network.

A gap can be formed between the front faces of the battery modules, which faces are centrally positioned in the vehicle and face one another, so that, in the event of a lateral vehicle crash, the two battery modules of a battery module column can move toward one another without directly hitting one another.

Preferably, at each of the transverse ends of the battery control module housing, there is connected a transverse console, each forming the structural connection between the respective vehicle floor longitudinal support and the battery control module housing. Typically, the total traction battery transverse extension is not needed to accommodate the battery controller. The battery control module housing can therefore be substantially smaller in the transverse extension than the total transverse extension of the traction battery. The resulting gaps between the respective longitudinal support and the centrally placed battery control module housing are structurally closed by the two transverse consoles.

The module housing and the two transverse consoles can be configured so as to be substantially integral with one another, and can be formed particularly preferably from a single aluminum die-cast part.

Alternatively, the two transverse consoles and the battery control module housing can be formed in multiple pieces and not assembled until after their manufacture. For example, the battery control module housing can be substantially an aluminum die-cast part. Particularly preferably, each transverse console consists of a machine-cut extrusion profile body, which is inexpensive to manufacture. Preferably, the two transverse consoles are configured so as to be substantially mirror-symmetrical to one another.

Preferably, the two transverse consoles each comprise a truss structure that provides a high structural rigidity at a low weight.

Preferably, the front or rear battery control module housing vertical wall and the adjacently opposed rear or front battery module vertical wall are configured so as to be complementary to one another, so that upon a touching collision of the two vertical walls in the event of a crash, a large surface area or approximately full surface area of two vertical walls abut one another without forming special pressure points. In the event of a crash, the two vertical walls therefore abut one another in a defined and uniform manner, so that a deformation of the housings of the battery modules and the battery control module is generally largely prevented.

Particularly preferably, the two vertical walls are substantially planar in form. Particularly preferably, the two vertical walls opposite one another in the non-crash state are spaced apart from one another at a distance of at least 10 mm, so that, in the event of a minor crash, the vertical walls do not touch one another.

BRIEF DESCRIPTION OF THE DRAWINGS

Two embodiment examples of the invention are explained in further detail in the following with reference to the drawings. Here.

DETAILED DESCRIPTION OF THE INVENTION

Figure 1:
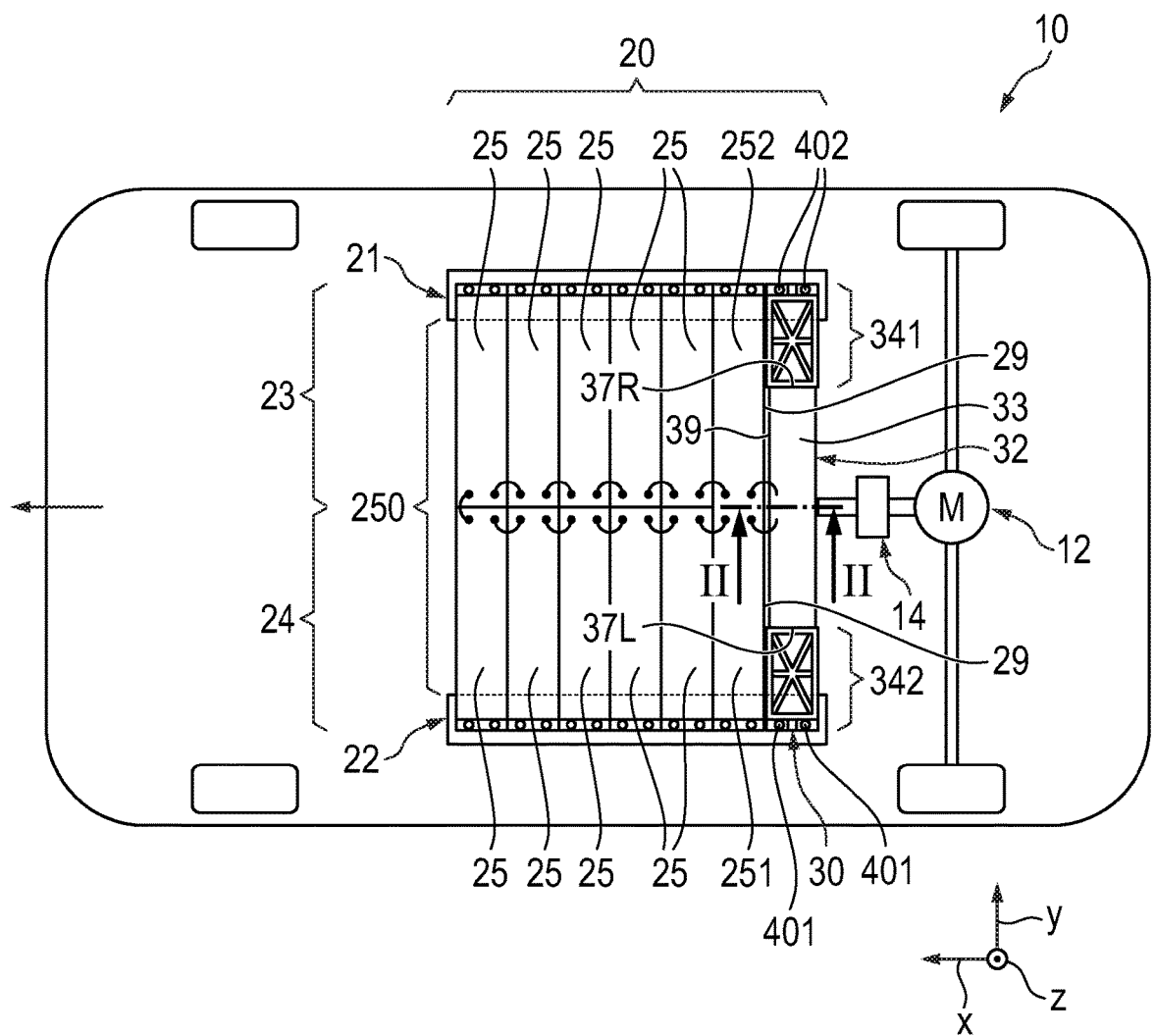
FIG. 1 shows a schematic top view of a traction battery vehicle floor having a first embodiment example of a battery control module.

In FIG. 1, a top plan view schematically shows a traction battery vehicle floor 20 having a traction battery 250 of a battery-electric passenger motor vehicle 10. The motor vehicle 10 comprises an electrical traction motor 12 and an engine controller 14, which is supplied with electrical energy by the traction battery 250. The traction battery vehicle floor 20 is configured in a plate-like manner lying in a horizontal plane and is arranged in the vehicle longitudinal direction X between a front axle and a rear axle of the motor vehicle 10.

In the present case, the traction battery vehicle floor 20 comprises two rows 23, 24, each having six identical battery modules 25, 251, 252, so that six columns having two identical battery modules 25, 251, 252 are formed in this manner. All battery modules 25, 251, 252 are arranged in a single horizontal plane X-Y. In the present case, all battery modules 25, 251, 252 are electrically connected in series with one another. Each battery module 25, 251, 252 has a module voltage of, for example, 70 V. However, the battery modules can alternatively also be electrically connected in two electrical strands in parallel with one another and can have a module voltage of, for example, 150 V each.

The battery modules 25, 251, 252 are each cuboidally elongated in form and are arranged with their longitudinal extension oriented in the vehicle transverse direction Y. With their distal, small-area front faces or ends, the battery modules 25, 251, 252 are each fastened, for example screwed, to a lateral vehicle floor longitudinal support 21, 22 in a supporting manner. The battery modules 25, 251, 252 each comprise a fluid-tight and crash-rigid battery module housing 25'. The proximal front faces or ends of the elongated battery modules 25, 251, 252 are spaced apart in the transverse direction Y a few centimeters from one another and are mechanically joined by longitudinal panels (not shown). The two rearmost battery modules 251, 252 forming a rearmost battery module column are connected in the same horizontal plane X, Y to a battery control bar 30 having a vehicle-central battery control module 32; 32', which encloses a battery control electronic system inside a self-supporting and crash-stable battery control module housing 33; 33' in order to monitor and control the battery modules 25, 251, 252.

Figure 2:
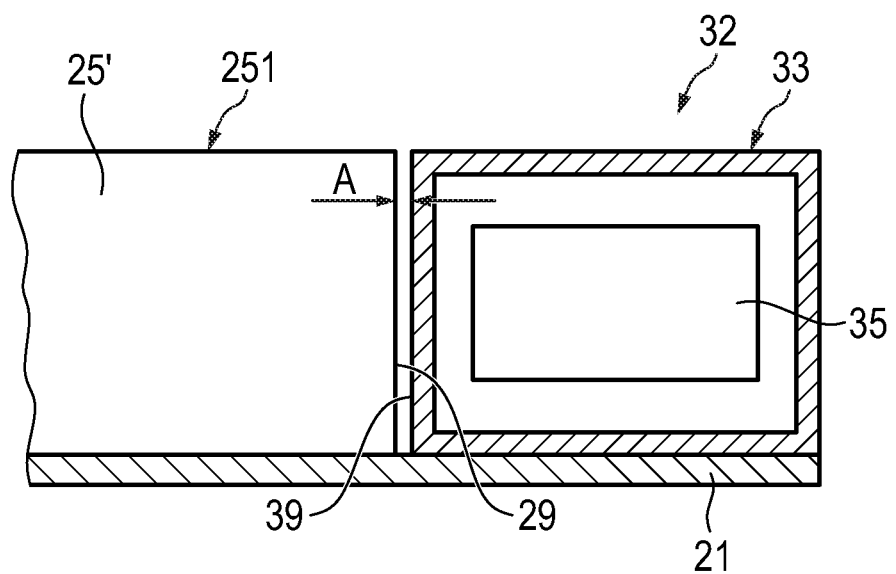
FIG. 2 shows a vehicle-central longitudinal section II-II of the battery control module of the traction battery vehicle floor of FIG. 1.
Figure 3:
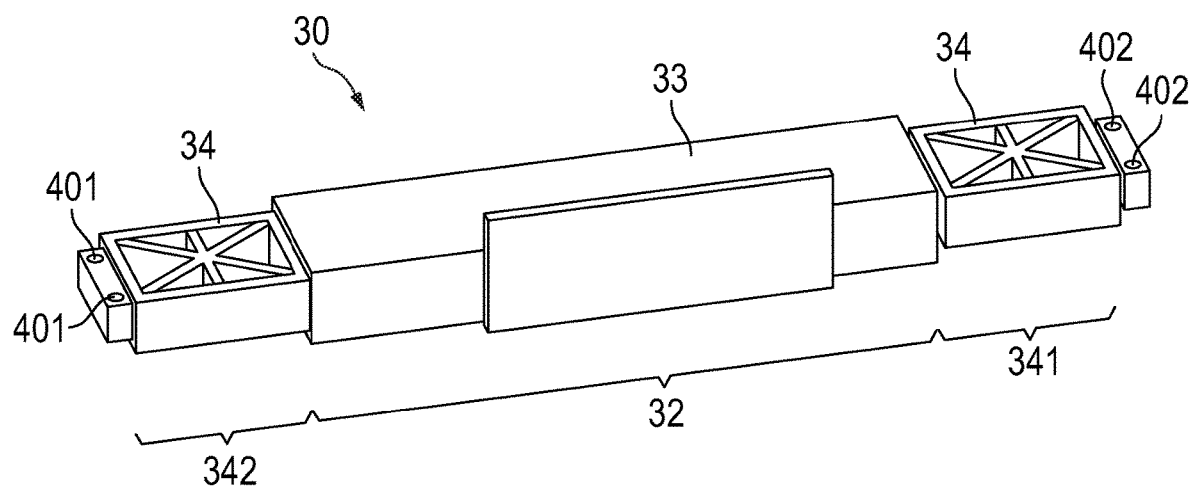
FIG. 3 shows a perspective view of the battery control module of FIG. 2.

In the first embodiment example shown in FIGS. 1-3, the battery control module housing 33 is a separate aluminum die-cast part formed by a pan and a screw-on lid. At each of the two transverse ends 37R, 37L of the housing 33, there is an abutting and adjoining transverse console 341, 342 having a truss structure. Each transverse console 341, 342 consists of a machine-cut extrusion profile body 34.

Each transverse console 341, 342 is respectively structurally connected, for example bolted with bolts 401, 402, or alternatively welded, to the battery control module housing 33 with its one transverse end and to the respective vehicle floor longitudinal support 21, 22 with its other transverse end. In this way, the battery control bar 30 produces a transverse rigidity of the traction battery vehicle floor 20, such that in this region, additional rigidifying on the body side in the transverse direction is largely unnecessary.

As can be seen in FIG. 2, the front vertical walls 39 of the battery control module housing 33 and the adjacently opposed rear battery module vertical wall 29 of the adjacent battery module 251, 252 are each fully planar in form and are spaced apart from one another at a distance A of about 15 mm. Thus, in the event of a severe rear crash, a minor deformation of the battery control bar 30 does not cause a deformation of the adjacent battery modules 251, 252. Even in the event of a severe deformation of the battery control bar 30, no selective force is applied to the battery module vertical wall 29 due to the smooth surface of the two opposing vertical walls 29, 39.

As indicated in FIG. 2, an actively liquid-cooled cooling plate 21 is arranged on the bottom side of the battery modules 25, 251, 252 and the battery control module 32.

Figure 4:
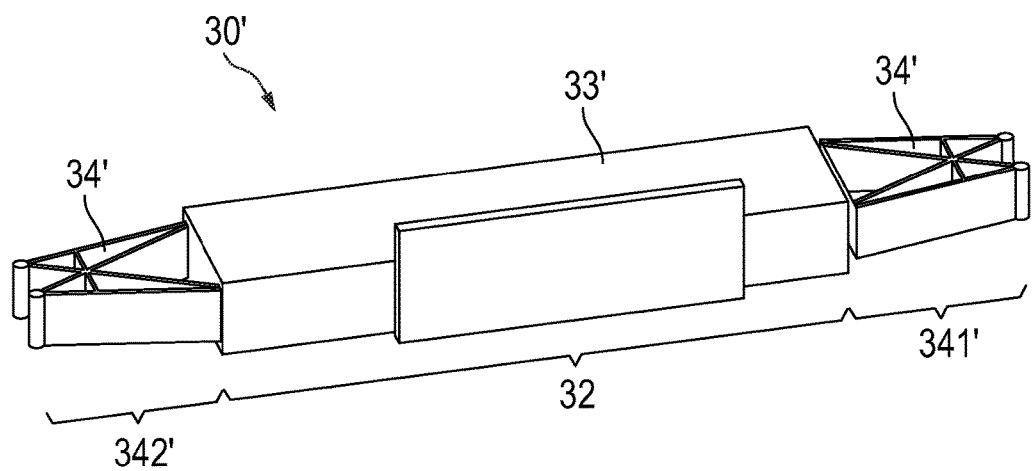
FIG. 4 shows a second embodiment example of a battery control module.

FIG. 4 shows a second embodiment example of the battery control bar 30', wherein the battery control module housing 33' and the two transverse consoles 341', 342' are configured so as to be substantially integral with one another and are formed by integrally connected aluminum die-cast parts 33', 34'.

What is claimed is:

1. A traction battery vehicle floor comprising:
   two lateral vehicle floor longitudinal supports;
   a plurality of self-supporting battery modules arranged in a horizontal plane (X,Y) and fastened directly to the two lateral vehicle floor longitudinal supports; and
   an electrical battery control module having a self-supporting battery control module housing, the electrical battery control module being arranged in the battery module horizontal plane (X, Y), the electrical battery control module being positioned adjacent to a frontmost and/or rearmost battery module of the plurality of self-supporting battery modules, wherein two transverse ends of the electrical battery control module housing are each structurally connected to one of the longitudinal supports; and
   two transverse consoles each being connected to one of the transverse ends of the battery control module housing, each transverse console forming a structural connection between one of the vehicle floor longitudinal supports and the battery control module housing,
   wherein the two transverse consoles comprise a truss structure.

2. The traction battery vehicle floor according to claim 1, wherein the battery control module housing and the two transverse consoles are formed substantially integrally with one another, and are formed from a single aluminum die-cast part.

3. The traction battery vehicle floor of claim 1, wherein a front or rear vertical wall of the battery control module housing and an adjacently opposed rear or front vertical wall of the battery module are shaped so as to be complementary to one another.

4. The traction battery vehicle floor according to claim 3, wherein the two vertical walls opposite one another are spaced apart from one another in a non-crash state at a distance (A) of at least 10 mm.

5. The traction battery vehicle floor according to claim 1, wherein the battery modules are elongated in form, longitudinally aligned in a vehicle transverse direction (Y), and arranged in two rows extending in a vehicle longitudinal direction (X), wherein each row has at least three of the battery modules.

6. A motor vehicle comprising the traction battery vehicle floor of claim 1.

7. A traction battery vehicle floor comprising:
two lateral vehicle floor longitudinal supports;
a plurality of self-supporting battery modules arranged in a horizontal plane (X,Y) and fastened directly to the two lateral vehicle floor longitudinal supports;
an electrical battery control module having a self-supporting battery control module housing, the electrical battery control module being arranged in the battery module horizontal plane (X, Y), the electrical battery control module being positioned adjacent to a frontmost and/or rearmost battery module of the plurality of self-supporting battery modules, wherein two transverse ends of the electrical battery control module housing are each structurally connected to one of the longitudinal supports; and
two transverse consoles each being connected to one of the transverse ends of the battery control module housing, each transverse console forming a structural connection between one of the vehicle floor longitudinal supports and the battery control module housing,
wherein the battery control module housing and the two transverse consoles are formed in multiple pieces, wherein each transverse console comprises a machine-cut extrusion profile body.

* * * * *